United States Patent Office 2,985,636
Patented May 23, 1961

2,985,636

PROCESS FOR PRODUCING PURE POLYVINYL ALCOHOL

Hans Anselm, Grafelfing, near Munich, and Jürgen Smidt and Heinz Winkler, Munich, Germany, assignors to Consortium für Elektrochemische Industrie G.m.b.H., Munich, Germany, a corporation of Germany No Drawing. Filed Oct. 24, 1955, Ser. No. 542,194

Claims priority, application Germany Oct. 22, 1954

8 Claims. (Cl. 260—91.3)

This invention relates to the production of pure polyvinyl alcohol and it has for its object to provide a novel and improved process for this purpose.

A related object is to produce pure polyvinyl alcohol through saponification of a carboxylic acid ester in aqueous dispersion by means of acid catalysts.

Other objects and advantages will be apparent as the nature of the invention is more fully disclosed.

It is known to convert aqueous dispersions of carboxylic acid esters, such, for example, as polyvinyl formate or acetate as well as mixed polymerisates of such vinyl esters, into aqueous solutions of polyvinyl alcohol, through heating in the presence of acid saponification catalysts such as mineral acids, sulphonic acids or acid ion exchangers. Heretofore, however, these solutions have contained varying quantities of unsaponified polyvinyl esters, besides the carboxylic acid which is liberated through saponification and the catalyst employed in the reaction.

This acid saponification of the polymeric vinyl esters also takes place, though incompletely, with considerable dilution of the saponification mixture with water, in a manner similar to the ordinary carboxylic acid esters. For instance, if polyvinyl acetate is saponified according to the prior art in about a 30% aqueous dispersion with a mineral acid as catalyst, for the purpose of producing a 10–20% strength aqueous polyvinyl alcohol solution, the saponification takes place with progressive reaction always more and more slowly and finally remains at a saponification stage of about 95%. In the case of stronger dilution with water it is true that the saponification degree increases, still limits are set on the extent of dilution in practice because 10–20% strength polyvinyl alcohol solutions are needed for various technical purposes and because the concentration of dilute polyvinyl alcohol solutions is difficult and expensive.

The good qualities of polyvinyl alcohol, however, are to a great extent dependent upon its ester content. It is therefore indispensable for certain purposes to carry the saponification of the polyvinyl esters to 99–100%.

According to the prior art this is accomplished, for example, by saponifying polyvinyl acetate by means of a mineral acid in aqueous dispersion in the presence of a large excess of a low-boiling alcohol such as methanol, and the acetic acid ester which is formed is continuously distilled off. This process, however, has the disadvantage that the formed acetic acid ester must, if necessary, be converted back into acetic acid and alcohol by a complicated process.

We have now discovered that esters of polyvinyl alcohol may be saponified, at least to the extent of 99%, in the presence of water and acid catalysts at elevated temperatures, if the carboxylic acid which is formed is removed by extraction from the saponification mixture. In this way aqueous solutions of polyvinyl alcohol are formed which, as regards solid matter, contains less than 1% polyvinyl esters.

According to the process of the present invention, for instance in the saponification of polyvinyl acetate, the saponification proceeds after extraction of the main quantity of the formed acetic acid by a suitable solvent while heating, so that with further extraction of the newly formed acetic acid a saponification degree of over 99% is finally achieved. The situation is the same in the case of other polymeric carboxylic acid esters of polyvinyl alcohol, for example in the case of polyvinyl formates.

The formed carboxylic acid can be practically entirely carried over in the extraction medium and can be recovered from it in a simple manner by known methods, for example by distillation or through azeotropic dehydration, in high output and of a purity which permits it to be used again for the production of the vinyl ester.

The mineral acid used as saponification catalyst, or strong organic acid used for the same purpose, can be removed by extraction from the polyvinyl alcohol at the same time as, or independently of, the extraction of the carboxylic acid formed through the saponification. Since through the extraction of the last-mentioned carboxylic acid a smaller or larger portion of the catalyst, depending upon the type of catalyst and the extraction medium, is at the same time removed from the saponification mixture, a sufficient quantity of catalyst must be used from the start, or it must be replenished so that it suffices for the complete development of the saponification. The determination of the mineral acid carried off with the carboxylic acid extraction may be accomplished by means of titration.

With the extraction of the liberated carboxylic acid a proper beginning is only then made when the saponification has so far advanced through heating of the saponification mixture that a homogeneous solution has been obtained, which is the case when the polyvinyl acetate attains a saponification degree of about 70%. Undissolved portions of polyester would produce, upon extraction, emulsions which could be separated only with difficulty. The extraction should therefore preferably be commenced at a higher saponification degree, advantageously at 90–95%. One should thus avoid having insufficiently saponified polyvinyl ester separate out through the withdrawal of the carboxylic acid, which serves as solvent for the polyvinyl ester which is being formed. Furthermore, the danger that insufficiently saponified polyvinyl ester will be carried along into the extract diminishes with increasing degree of saponification. Finally, the possibility of obtaining a concentrated carboxylic acid extract is increased by beginning the extraction only at a high degree of saponification.

The extraction of the saponification mixture which has become homogeneous by reason of a suitable extraction medium forming a second phase with it becomes preferable the same way as the saponification done at elevated temperature, so that during the extraction the saponification can continue. The saponification occurs particularly fast and completely if the extraction takes place continuously under heat, since the carboxylic acid being liberated is at once taken up by the solvent.

For the extraction of the carboxylic acid from the saponification solution there are used such fluids as form readily separable extract phases from the aqueous phase, which furthermore readily dissolve the carboxylic acid but practically do not dissolve the polyvinyl alcohol, and which, furthermore, and in conclusion, do not suffer any disturbing changes under the influence of the saponification catalyst and the increased temperature, or react with the polyvinyl compound. The following extraction media are particularly suitable: ethers, such as isopropyl ether, ketones, such as 2-butanone, 2-pentanone, methylisobutylketone and isophorone, as well as difficultly-saponifying esters, such as tributyl phosphate, alone or in combination.

After completing the extraction of the carboxylic acid, the extraction medium dissolved or emulsified in the polyvinyl alcohol is removed by means of distillation, or, in the case of difficultly-volatilizing substances, such as tributyl phosphate, by means of extraction with a very volatile medium such as, for instance, as butyl alcohol.

Through the extraction medium applied according to the invention, there is coextracted, as mentioned, a considerable part of the strong acid used as saponification catalyst. The remainder of the saponification catalyst, as far as it consists of a strong acid, as well as the carboxylic acid liberated from the polyester, can be removed from the polyvinyl alcohol solution by means of dialysis or preferably by means of the easy-boiling extraction medium mentioned above, such as butyl alcohol, simultaneously with the extraction of the remainder of the extraction medium.

It is naturally also possible to precipitate the extracted polyvinyl alcohol solution, freed from the extraction medium by means of non-dissolving organic liquids, such as methanol or acetone, and to free the separated polyvinyl alcohol by means of subsequent rinsing of the remaining portions of the catalyst. If an acid ion exchanger is used for the saponification of the polyester, the latter is separated after completion of the saponification and the extraction of the carboxylic acid by mechanical means, e.g. through filtration, from the polyvinyl alcohol solution.

Our process therefore makes possible the production of polyvinyl alcohol which is practically free from polymeric carboxylic acid ester, from the carboxylic acid which is produced by the latter, and from the saponification catalyst.

Example 1

A dispersion of 300 g. polyvinyl acetate in 700 g. water, which was stabilized with 10 g. polyvinyl alcohol and to which 9 g. perchloric acid and 3 g. hydrochloric acid were added as catalyst, was heated, while being stirred, to 80° C. After temporary thickening the mixture was homogeneous after about 3.5 hours, and upon analysis a saponification degree of 75% was found. After another 2 hours 89%, and after an aggregate of 8 hours 95% of the polyvinyl acetate was saponified. With further heating the ester content no longer diminished.

The extraction of the liberated acetic acid was then taken up at 80° C. by means of tributyl phosphate. In each case 250 ccm. of tributyl phosphate was added, stirred energetically for 15 minutes and the extraction layer quickly forming after stopping the stirring was drawn off above. In the course of three hours 3 liters of extraction layers formed. In the first liter there was a quantity of 60%, in the second 25%, in the third 10% acetic acid, which could be produced with the complete saponification of the polyvinyl acetate. Besides this, the extract contained 63% of the used perchloric acid and 30% of the used hydrochloric acid.

After neutralization of the mineral acids, the acetic acid could be obtained from the tributyl phosphate extract through azeotropic dehydration with benzol and vacuum distillation, with an output of more than 90%, in water-free form.

The extraction was now continued under heat with water-saturated butyl alcohol, in order to remove from the saponification mixture the remainder of tributyl phosphate, perchloric acid, hydrochloric acid and acetic acid, obtained at extraction of the acetic acid. For this purpose the butyl alcohol was conducted to the lowest point of the vessel while being energetically stirred and again removed as overflow at the top of the stirring vessel. During two hours 3 liters of butyl alcohol were conducted through the saponification mixture; the portion of the butyl alcohol which went into solution was driven off by distillation at moderate vacuum.

The remaining about 20% aqueous polyvinyl alcohol was almost clear and colorless. It was free of unsaponified polyvinyl acetate and contained only traces of acid.

Example 2

A dispersion of 290 g. polyvinyl acetate and 210 g. water, which contained 10 g. polyvinyl alcohol as emulsifier, was well mixed in an agitator vessel with 5 g. of 60% strength perchloric acid and 2.8 g. of 36% strength hydrochloric acid, and after stopping the agitator it was heated in a boiling water-bath for eight hours. The clear tough mass thereupon showed a saponification degree of 75%. It was diluted by the introduction of 700 g. of hot water and heated another eight hours in the boiling water-bath while being stirred. The saponification degree now reached 96% and remained at this percentage.

The extraction of the liberated acetic acid was performed at 80° C. by means of methyl isobutyl ketone, the latter being introduced into the saponification mixture at the lowest point while the agitator was in fast motion, and was removed again at the top of the agitator vessel through an overflow pipe. After the passage of 3 liters of extraction medium during about 3 hours there was withdrawn 94.5% of the acetic acid quantity obtainable with full saponification from the saponification mixture. After neutralization of the mineral acids dissolved in the extract and distilling off the methyl isobutyl ketone, the extracted acetic acid remained behind in water-free form.

The saponification of the polyvinyl acetate had advanced to more than 99%. The small quantity of methyl isobutyl ketone which remained in the substance was distilled off with the use of a moderate vacuum. The removal of the small acid remains was effected by means of butyl alcohol in the manner described in Example 1. The purity of the polyvinyl alcohol solution obtained correspond with that obtained according to Example 1.

Example 3

A dispersion of 245 g. polyvinyl formate with 24 g. polyvinyl alcohol as emulsifier was heated in 730 g. water with 5 g. oxalic acid while stirring in a boiling water-bath. After 15 hours about 95% of the ester was saponified.

The formic acid liberated was extracted at 60° C. by means of 3 liters of a mixture of equal parts by weight of isopropyl ether and 2-butanone in the manner indicated in Example 2, in the course of 1 hour. In order to complete the saponification 10 g. trichloracetic acid was added, heat was again applied for 2 hours to about 98° C. and thereupon the extraction was repeated with 2 liters of the same solvent mixture. The recovery of the formic acid from the extract followed by distilling off the extraction medium. The extraction medium which had gone into the polyvinyl alcohol solution was distilled out by heating to boiling temperature, whereby simultaneously remnants of trichloracetic acid broke up into chloroform and carbonic acid. The polyvinyl alcohol solution which was obtained was practically free from polyvinyl formate and acid.

Example 4

To 290 g. polyvinyl acetate in pearl form were added 700 g. water in which 9 g. perchloric acid and 3 g. hydrochloric acid were dissolved. The saponification was effected in boiling water-bath while being stirred, the saponification mixture reaching in 12 hours an acetic acid content of 18.8%, corresponding to a saponification of polyvinyl acetate of 93%.

The extraction of the acetic acid occurred at 50° C. with 3 liters of a mixture of 80 parts by volume methyl ethyl ketone and 20 parts by volume isopropyl ether in the manner set forth in Example 2. Thereby 180 g.=96% acetic acid with 80 g. water went over into the extract.

In order to complete the saponification the extracted saponification mixture was again heated in the boiling water-bath in a closed vessel for 3 hours. The acetic acid content rose from 0.8% to 2.0%, corresponding to an increase of the saponification degree to over 99%. In the repetition of the extraction a further 11 g. of acetic acid were converted into the extract.

With the object of removing the remains of the acetic acid and catalyst from the raw polyvinyl alcohol an extraction of the alcohol was made with butyl alcohol as in Example 1. The latter was finally separated from the pure polyvinyl alcohol solution by means of distillation.

The invention claimed is:

1. Process for producing pure polyvinyl alcohol by saponifying a carboxylic acid ester of polyvinyl alcohol in admixture with water and an acid catalyst, characterized by removing the liberated carboxylic acid from the saponification mixture by continuous extraction during the saponification with a non-aqueous solvent which is immiscible with the polyvinyl alcohol solution and which is selected from the group consisting of isopropyl ether, 2-butanone, 2-pentanone, methyl isobutyl ketone, isophorone, tributyl phosphate, and mixtures thereof, which readily dissolve said acid while dissolving practically no polyvinyl alcohol.

2. Process according to claim 1, in which the extraction of the liberated carboxylic acid is commenced after the major part of the carboxylic acid ester of polyvinyl alcohol has been saponified.

3. Process according to claim 2, in which the extraction of the carboxylic acid liberated by the reaction is continued until the carboxylic acid ester of polyvinyl alcohol has been saponified to over 99% and the carboxylic acid has been extracted to the extent of at least 95%.

4. Process according to claim 1, in which the extraction media which remain are removed from the saponification mixture upon completion of the extraction.

5. Process according to claim 3, in which the carboxylic acid being liberated and extracted is recovered from the extract after neutralization of the mineral acid by distillation.

6. Process according to claim 4, in which the remaining portions of the saponification catalyst, carboxylic acid and extraction media are removed from the saponification mixture, after completion of the saponification and extraction of the carboxylic acid, by distillation.

7. Process according to claim 4, in which the remaining portions of the saponification catalyst, carboxylic acid and extraction media are removed from the saponification mixture, after completion of the saponification and extraction of the carboxylic acid, by extraction with a highly volatile medium.

8. Process according to claim 4, in which the extracted polyvinyl alcohol solution freed from the extraction medium is precipitated by means of a non-solvent for polyvinyl alcohol, and the separated polyvinyl alcohol rinsed pure from the catalyst residues.

References Cited in the file of this patent

UNITED STATES PATENTS

| | | |
|---|---|---|
| 2,248,620 | Freedman et al. | July 8, 1941 |
| 2,407,820 | Durrum | Sept. 17, 1946 |
| 2,493,265 | Scheibel | Jan. 3, 1950 |
| 2,551,987 | Vogler | Jan. 8, 1952 |
| 2,583,991 | Blume | Jan. 29, 1952 |
| 2,629,413 | Goebel et al. | Feb. 24, 1953 |
| 2,642,420 | Kenyon et al. | June 16, 1953 |
| 2,668,810 | Bergmeister | Feb. 9, 1954 |